United States Patent
Yamazaki et al.

(10) Patent No.: US 9,154,065 B2
(45) Date of Patent: Oct. 6, 2015

(54) MOTOR CONTROL APPARATUS AND MAGNETIC-POLE POSITION ESTIMATING METHOD

(71) Applicant: KABUSHIKI KAISHA YASKAWA DENKI, Kitakyushu-shi (JP)

(72) Inventors: Akira Yamazaki, Fukuoka (JP); Hirofumi Kinomura, Fukuoka (JP); Hideaki Iura, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 25 days.

(21) Appl. No.: 14/156,460

(22) Filed: Jan. 16, 2014

(65) Prior Publication Data
US 2014/0292237 A1 Oct. 2, 2014

(30) Foreign Application Priority Data
Mar. 29, 2013 (JP) ................. 2013-075062

(51) Int. Cl.
*H02P 21/00* (2006.01)
*H02P 6/18* (2006.01)
*H02P 6/00* (2006.01)
*H02P 25/02* (2006.01)

(52) U.S. Cl.
CPC *H02P 6/183* (2013.01); *H02P 6/00* (2013.01); *H02P 21/0035* (2013.01); *H02P 25/023* (2013.01)

(58) Field of Classification Search
CPC .............. H02P 21/146; H02P 2203/11; H02P 21/0042; H02P 25/023; H02P 6/183; H02P 6/185; H02P 21/06; H02P 2207/05; H02P 6/16; H02P 6/18; H02P 21/0035; H02P 21/0039; H02P 21/0053; H02P 21/0089

USPC .......... 318/139, 400.01, 400.02, 400.04, 592, 318/700, 721, 807
See application file for complete search history.

(56) References Cited

U.S. PATENT DOCUMENTS

| | | | | |
|---|---|---|---|---|
| 6,005,365 A | * | 12/1999 | Kaneko et al. | 318/700 |
| 6,054,818 A | * | 4/2000 | Tabata et al. | 318/139 |
| 6,081,093 A | * | 6/2000 | Oguro et al. | 318/807 |
| 6,242,882 B1 | * | 6/2001 | Kaneko et al. | 318/700 |

(Continued)

FOREIGN PATENT DOCUMENTS

| | | |
|---|---|---|
| JP | 2001-339999 | 12/2001 |
| JP | 2011-193726 | 9/2011 |

OTHER PUBLICATIONS

Japanese Office Action for corresponding JP Application No. 2013-075062, Feb. 10, 2015.

*Primary Examiner* — Paul Ip
(74) *Attorney, Agent, or Firm* — Mori & Ward, LLP

(57) ABSTRACT

A motor control apparatus according to an embodiment includes a power conversion unit and a control unit. The power conversion unit supplies power to a motor having salient pole characteristic. The control unit performs proportional-integral control on the deviation between a current reference and a current flowing into the motor to generate a voltage reference, and controls the power conversion unit on the basis of the voltage reference. The control unit estimates the magnetic-pole position of a rotor of the motor on the basis of a high-frequency current flowing into the motor by controlling the power conversion unit, and corrects the estimated magnetic-pole position on the basis of an integrated value of the proportional-integral control.

11 Claims, 6 Drawing Sheets

(56) References Cited

U.S. PATENT DOCUMENTS

| | | | |
|---|---|---|---|
| 6,788,024 B2* | 9/2004 | Kaneko et al. | 318/807 |
| 6,791,293 B2* | 9/2004 | Kaitani | 318/592 |
| 6,801,011 B2* | 10/2004 | Ide | 318/700 |
| 6,838,843 B2* | 1/2005 | Imai et al. | 318/400.02 |
| 7,084,591 B2* | 8/2006 | Kobayashi et al. | 318/400.02 |
| 7,157,876 B2* | 1/2007 | Ide et al. | 318/400.04 |
| 7,230,398 B2* | 6/2007 | Miyauchi | 318/400.01 |
| 7,348,749 B2* | 3/2008 | Ide et al. | 318/599 |
| 7,443,130 B2* | 10/2008 | Takao et al. | 318/806 |
| 7,511,448 B2* | 3/2009 | Terada et al. | 318/807 |
| 7,619,385 B2* | 11/2009 | Suzuki et al. | 318/705 |
| 7,839,113 B2* | 11/2010 | Maeda et al. | 318/721 |
| 8,035,330 B2* | 10/2011 | Maeda et al. | 318/721 |
| 8,125,175 B2* | 2/2012 | Yoneda et al. | 318/689 |
| 8,159,161 B2* | 4/2012 | Tomigashi | 318/400.02 |
| 8,174,220 B2* | 5/2012 | Inoue et al. | 318/400.02 |
| 8,269,436 B2* | 9/2012 | Hashimoto et al. | 318/400.02 |
| 2004/0051495 A1* | 3/2004 | Kaneko et al. | 318/807 |
| 2007/0132424 A1* | 6/2007 | Takao et al. | 318/806 |
| 2009/0237015 A1* | 9/2009 | Hashimoto et al. | 318/400.02 |
| 2010/0045218 A1* | 2/2010 | Tomigashi | 318/400.02 |
| 2013/0069572 A1* | 3/2013 | Maekawa | 318/400.14 |

* cited by examiner

MOTOR CONTROL APPARATUS AND MAGNETIC-POLE POSITION ESTIMATING METHOD

CROSS-REFERENCE TO RELATED APPLICATION

This application is based upon and claims the benefit of priority of the prior Japanese Patent Application No. 2013-075062, filed on Mar. 29, 2013, the entire contents of which are incorporated herein by reference.

FIELD

The embodiments discussed herein are directed to a motor control apparatus and a magnetic-pole position estimating method.

BACKGROUND

When a motor such as a permanent magnet synchronous motor is started, the difference between a magnetic-pole position and the control phase of a rotor may generate a shock at the start or rotate the rotor in the direction opposite to the instructed direction. A conventional motor control apparatus performs an initial magnetic-pole position estimating process to estimate an initial magnetic-pole position of a rotor using the salient pole characteristic and the magnetic saturation characteristic of a motor when the motor is started.

In such an initial magnetic-pole position estimating process, after the magnetic-pole position of the rotor is tentatively estimated, the magnetic-pole position of the rotor is definitively estimated as an initial magnetic-pole position on the basis of the polarity (the north pole, the south pole) at the magnetic-pole position that is tentatively estimated. This tentative estimation is performed by, for example, applying a high-frequency voltage to the motor and estimating the magnetic-pole position of the rotor on the basis of the high-frequency current that is caused by the salient pole characteristic of the motor due to the high-frequency voltage to flow in the motor.

The above-described definitive estimation is performed by, for example, applying a pulse voltage varying between positive and negative voltages to the motor to magnetically saturate the magnetic flux in the d-axis of the motor, detecting the difference in change of the current flowing into the motor to determine the polarity at the magnetic-pole position, and correcting the magnetic-pole position that is tentatively estimated based on the polarity thus identified.

While this initial magnetic-pole position estimating process is a technique based on the premise that the motor is stopped, a technique is proposed that makes it possible to estimate the initial magnetic-pole position of the rotor even when the rotor of the motor is rotating due to free running or drag by a load (e.g., see Japanese Patent Application Laid-open No. 2011-193726). Such a technique prevents the occurrence of overcurrent by performing application of a high-frequency voltage and application of a pulse voltage at the same time, and enabling control of the fundamental wave current.

However, when performing current control while applying the pulse voltage to perform the polarity determination, the difference in current change due to the magnetic saturation on the d-axis magnetic flux becomes smaller because of the effect of the current control, whereby the accuracy of the polarity determination is reduced. This requires use of a band-pass filter or increased amplitude of the pulse voltage to avoid the effect of the band of the pulse voltage on the current control, thereby complicating the circuit and highly increasing the voltage of the pulse voltage.

SUMMARY

A motor control apparatus according to one aspect of the embodiments includes a power conversion unit and a control unit. The power conversion unit supplies power to a motor having salient pole characteristic. The control unit performs proportional-integral control on the deviation between a current reference and a current flowing into the motor to generate a voltage reference, and controls the power conversion unit on the basis of the voltage reference. Furthermore, the control unit estimates the magnetic-pole position of a rotor of the motor on the basis of a high-frequency current flowing into the motor by controlling the power conversion unit, and corrects the estimated magnetic-pole position on the basis of an integrated value of the proportional-integral control.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Embodiments of a motor control apparatus and a magnetic-pole position estimating method disclosed in the present application will now be described in detail with reference to the attached drawings. It should be noted that the present invention is not limited by the following embodiments.

Figure 1:
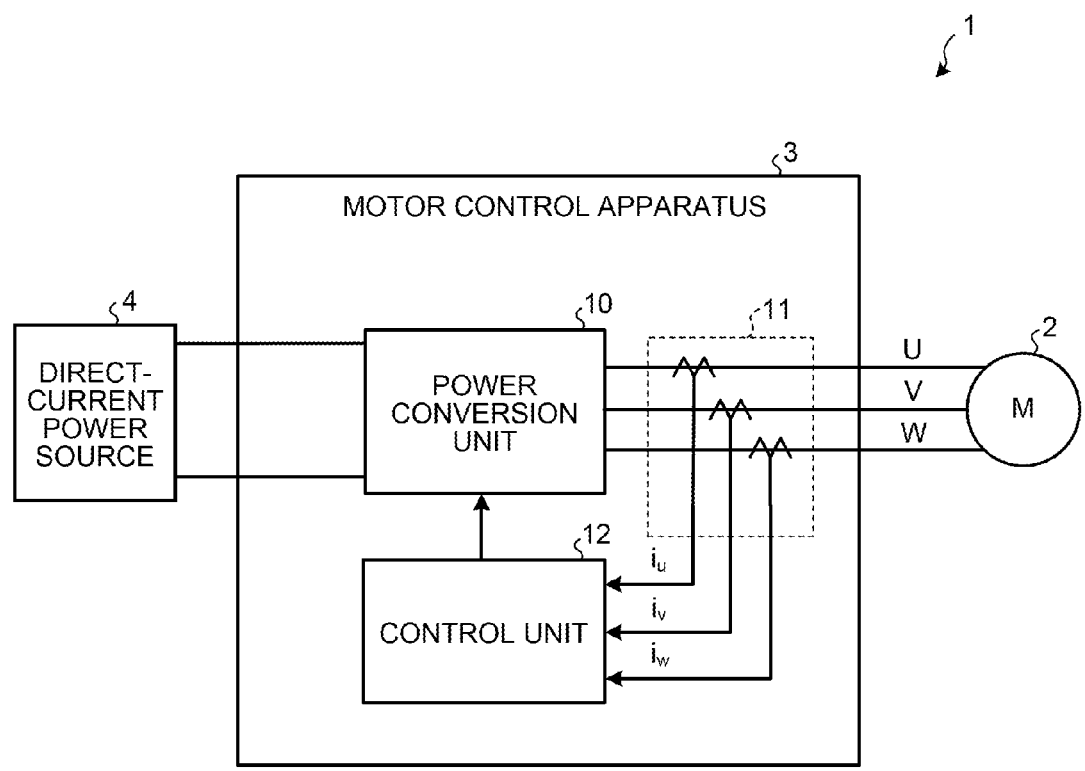
FIG. 1 is a diagram illustrating a configuration example of a motor drive system according to an embodiment.

FIG. 1 is a diagram illustrating a configuration example of a motor drive system according to an embodiment. As depicted in FIG. 1, this motor drive system 1 according to the embodiment includes a three-phase alternating-current motor 2 (hereinafter referred to as the motor 2), a motor control apparatus 3, and a direct-current power source 4.

The motor 2 is a motor having salient pole characteristic and is, for example, an interior permanent magnet synchronous motor (IPMSM) in which a rotor embedded with a plurality of permanent magnets rotates inside a stator. This motor 2 may be not only a motor having a drive function but also a motor generator or a generator having a power-generating function. For example, the motor 2 may be a generator connected to a rotor of a wind turbine, for example.

The motor control apparatus 3 includes a power conversion unit 10, a current detection unit 11, and a control unit 12. This motor control apparatus 3 converts direct-current power supplied from the direct-current power source 4 into three-phase alternating-current power of desired frequency and voltage with known pulse width modulation (PWM) control, and outputs it to the motor 2. The motor control apparatus 3 may include the direct-current power source 4.

The power conversion unit 10 is connected between the motor 2 and the direct-current power source 4, and supplies, to the motor 2, voltage and current corresponding to PWM signals supplied from control unit 12. This power conversion unit 10 is, for example, a three-phase inverter circuit that includes six switching elements in a three-phase bridge connection. The switching elements in the three-phase inverter circuit are semiconductor elements such as insulated gate bipolar transistors (IGBT) or metal-oxide-semiconductor field-effect transistors (MOSFET).

The direct-current power source 4 may be configured to convert alternating-current power into direct-current power to output the direct-current power, for example, in a configuration in which a rectifier circuit with diodes or switching elements and a smoothing capacitor are combined. In this case, an alternating-current power source is connected to the input of the rectifier circuit.

The current detection unit 11 detects a current supplied from the power conversion unit 10 to the motor 2. More specifically, the current detection unit 11 detects instantaneous values $i_u$, $i_v$, and $i_w$ (hereinafter referred to as output currents $i_u$, $i_v$, and $i_w$) of currents respectively flowing from the power conversion unit 10 to a U-phase, a V-phase, and a W-phase of the motor 2. The current detection unit 11 includes Hall elements that are magnetoelectric devices, for example, to detect the currents.

The control unit 12, in a dq coordinate system that is a rectangular coordinate system rotating in synchronization with a frequency of an alternating-current voltage output from the power conversion unit 10, divides current components into a component of a d-axis parallel to a magnetic flux of the motor 2 and a component of a q-axis orthogonal to the d-axis to perform vector control, and generates PWM signals. These PWM signals are input as gate signals to the switching elements in the power conversion unit 10, whereby the power conversion unit 10 is controlled.

The control unit 12 tentatively estimates the magnetic-pole position of the rotor by applying a high-frequency current to the motor 2 and corrects this magnetic-pole position on the basis of the polarity (the north pole, the south pole), thereby estimating the initial magnetic-pole position of the rotor. The control unit 12 determines the polarity of the magnetic-pole position on the basis of an integrated value of proportional-integral control (hereinafter referred to as PI control) in the q-axis current control when the rotor is rotating. This enables the control unit 12 to easily estimate the initial magnetic-pole position of the rotor even when the rotor is rotating. The configuration of the control unit 12 will be described in detail below.

Figure 2:
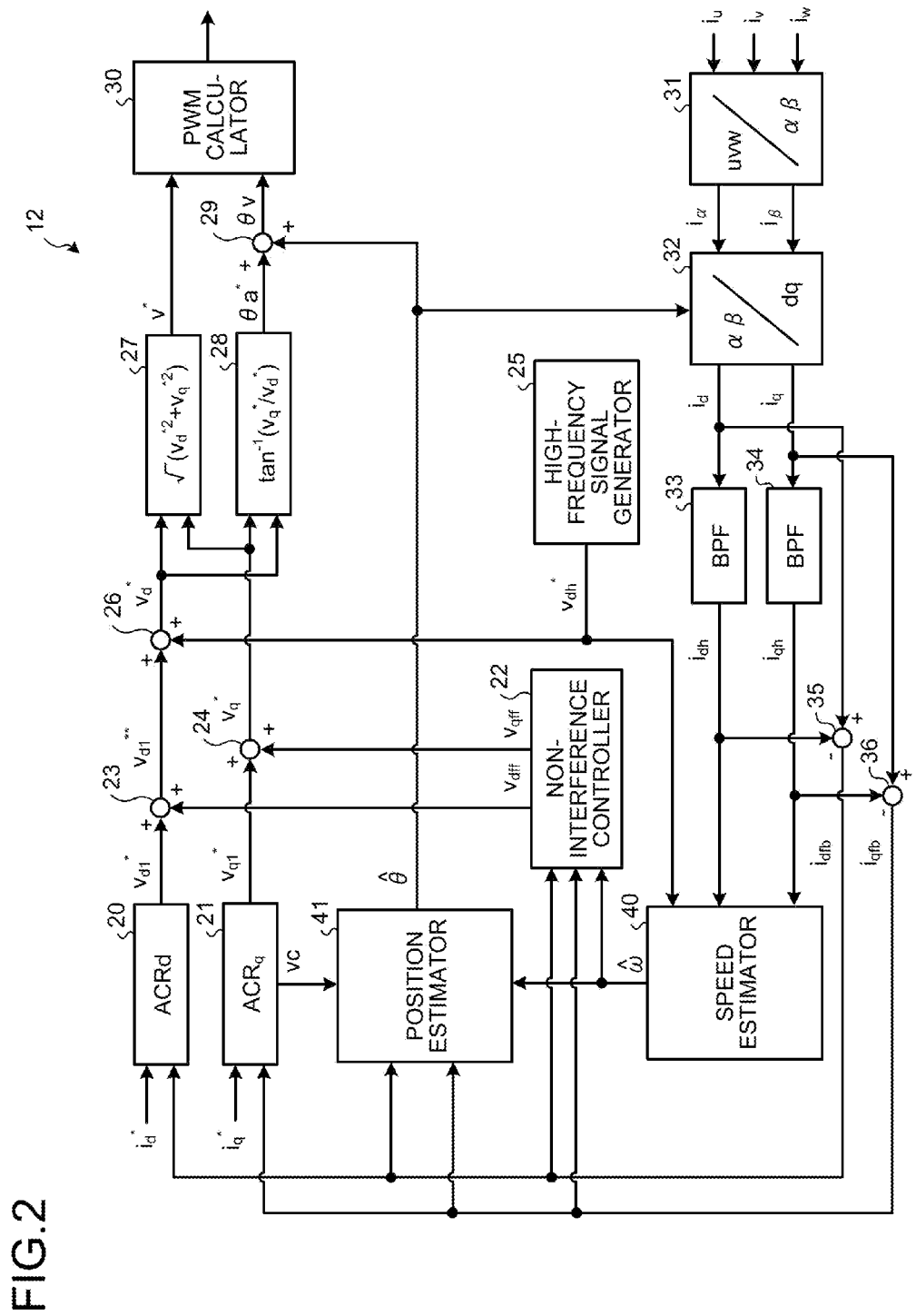
FIG. 2 is a diagram illustrating a configuration example of a control unit of a motor control apparatus depicted in FIG. 1.

FIG. 2 is a diagram illustrating a configuration example of the control unit 12 of the motor control apparatus 3. As depicted in FIG. 2, the control unit 12 includes a d-axis current controller 20, a q-axis current controller 21, a non-interference controller 22, adders 23, 24, 26, and 29, a high-frequency signal generator 25, a voltage reference generator 27, a phase reference generator 28, and a PWM calculator 30. Note that the d-axis component and the q-axis component of the current reference are hereinafter referred to as the d-axis current reference $i_d^*$ and the q-axis current reference $i_q^*$, respectively.

The d-axis current controller 20 receives the d-axis current reference $i_d^*$ and a d-axis current $i_{dfb}$ described later, performs the PI control so that the deviation between the d-axis current reference $i_d^*$ and the d-axis current $i_{dfb}$ becomes zero to generate a d-axis voltage reference $v_{d1}^*$, and outputs the result to the adder 23.

The q-axis current controller 21 receives the q-axis current reference $i_q^*$ and a q-axis current $i_{qfb}$ described later, performs the PI control so that the deviation between the q-axis current reference $i_q^*$ and the q-axis current $i_{qfb}$ becomes zero to generate a q-axis voltage reference $v_{q1}^*$, and outputs the result to the adder 24.

Figure 3:
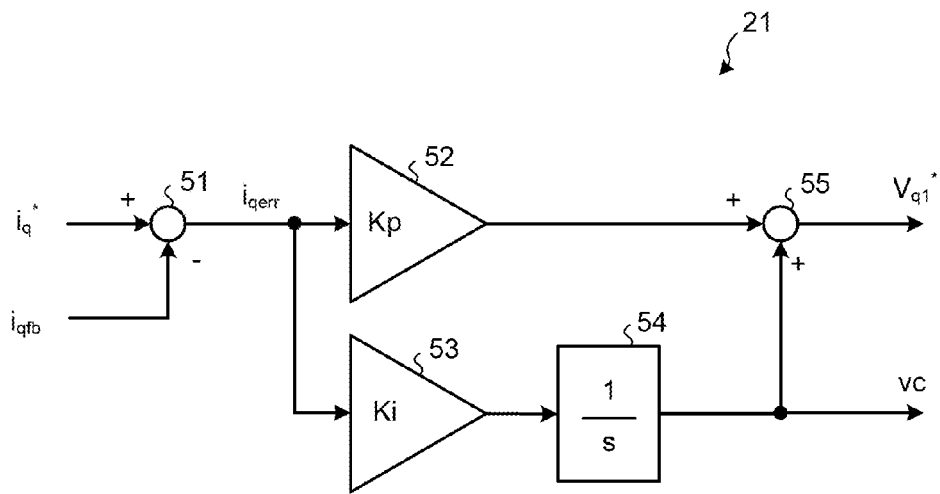
FIG. 3 is a diagram illustrating a configuration example of a q-axis current controller depicted in FIG. 2.

FIG. 3 is a diagram illustrating a configuration example of the q-axis current controller 21. As depicted in FIG. 3, the q-axis current controller 21 includes a subtracter 51, amplifiers 52 and 53, an integrator 54, and an adder 55. The subtracter 51 subtracts the q-axis current $i_{qfb}$ from the q-axis current reference $i_q^*$ to generate a q-axis deviation signal $i_{qerr}$, and outputs the result to the amplifiers 52 and 53.

The amplifier 52, which has a proportional gain Kp, multiplies the q-axis deviation signal $i_{qerr}$ by Kp and outputs the result to the adder 55. The amplifier 53, which has a proportional gain Ki, multiplies the q-axis deviation signal $i_{qerr}$ by Ki and outputs the result to the integrator 54. The integrator 54 integrates the q-axis deviation signal $i_{qerr}$ multiplied by Ki, and outputs a q-axis integrated value vc, which is the integration result, to the adder 55 and a position estimator 41 described later. The adder 55 adds the output from the amplifier 52 and the output from the integrator 54, and outputs a q-axis voltage reference $v_{q1}^*$, which is the addition result.

Referring back to FIG. 2, the description of the control unit 12 will be continued. The non-interference controller 22 compensates for interference between the d-axis and the q-axis in addition to induced voltage. The non-interference controller 22 generates and outputs a d-axis voltage compensating value $v_{dff}$ and a q-axis voltage compensating value $v_{qff}$ on the basis of the d-axis current $i_{dfb}$, the q-axis current $i_{qfb}$, a speed estimated value $\hat{\omega}$, and a induced voltage constant $\phi$. The non-interference controller 22 calculates $i_{dfb} \times \hat{\omega} L_d + \hat{\omega} \phi$ to determine the q-axis voltage compensating value $v_{qff}$ and calculates $-i_{qfb} \times \hat{\omega} L_q$ to determine the d-axis voltage compensating value $v_{dff}$, where $L_d$ is a d-axis inductance value of the motor 2, and $L_q$ is a q-axis inductance value of the motor 2.

The adder 23 adds the d-axis voltage compensating value $v_{dff}$ to the d-axis voltage reference $v_{d1}^*$ to generate a d-axis voltage reference $v_{d1}^{**}$, and outputs the result to the adder 26. The adder 24 adds the q-axis voltage compensating value $v_{qff}$ to the q-axis voltage reference $v_{q1}^*$ to generate a q-axis voltage reference $v_q^*$, and outputs the result to the voltage reference generator 27 and the phase reference generator 28.

The high-frequency signal generator 25 generates a high-frequency signal $v_{dh}^*$ to output it to the adder 26. The adder 26 adds the high-frequency signal $v_{dh}^*$ to the d-axis voltage reference $v_{d1}^*$ to generate a d-axis voltage reference $v_d^*$, and outputs the result to the voltage reference generator 27 and the phase reference generator 28. The frequency $\omega_h$ of the high-frequency signal $v_{dh}^*$ is set to be higher than the frequency of a voltage for driving the motor 2 as described later.

The voltage reference generator 27 determines an output voltage reference $v^*$ on the basis of the d-axis voltage reference $v_d^*$ and the q-axis voltage reference $v_q^*$. For example, the voltage reference generator 27 determines the output voltage reference $v^*$ from the following formula (1). The output voltage reference v* is output from the voltage reference generator 27 to the PWM calculator 30.

$$v^* = \sqrt{v_d^{*2} + v_q^{*2}} \quad (1)$$

The phase reference generator 28 determines an output phase reference θa* on the basis of the d-axis voltage reference $v_d^*$ and the q-axis voltage reference $v_q^*$. For example, the phase reference generator 28 determines the output phase reference θa* from the following formula (2).

$$\theta a^* = \tan^{-1}(v_q^*/v_d^*) \quad (2)$$

The adder 29 adds a position estimated value θ^ output from the position estimator 41 to the output phase reference θa* output from the phase reference generator 28 to calculate a phase θv, and outputs the result to the PWM calculator 30.

The PWM calculator 30 generates output voltage references $v_u^*$, $v_v^*$, and $v_w^*$ on the basis of the output voltage reference v* and the phase θv, and generates PWM signals in accordance with a technique such as triangular wave comparison on the basis of the output voltage references $v_u^*$, $v_v^*$, and $v_w^*$ to output the PWM signals to the power conversion unit 10. Thus, the semiconductor switching elements included in the power conversion unit 10 are on-off controlled, and three-phase alternating power based on the output voltage references $v_u^*$, $v_v^*$, and $v_w^*$ is output from the power conversion unit 10 to the motor 2. For example, the PWM calculator 30 can generate the output voltage references $v_u^*$, $v_v^*$, and $v_w^*$, using arithmetic expressions such as $v_u^* = v^* \times \sin(\theta v)$, $v_v^* = v^* \times \sin(\theta v - 120)$, and $v_w^* = v^* \times \sin(\theta v - 240)$.

The control unit 12 of the motor control apparatus 3 further includes a three-phase/two-phase converter 31, a dq coordinate converter 32, bandpass filters (BPF) 33 and 34, and subtracters 35 and 36.

The three-phase/two-phase converter 31 converts the output currents $i_u$, $i_v$, and $i_w$ into α and β components of two orthogonal axes on the fixed coordinates to determine a fixed-coordinate current vector $i_{\alpha\beta}$ that has a current component $i_\alpha$ in the α-axis direction and a current component $i_\beta$ in the β-axis direction as vector components in the αβ axis coordinate system.

The dq coordinate converter 32 uses the position estimated value θ^ output from the position estimator 41 to convert the fixed-coordinate current vector $i_{\alpha\beta}$ into d and q components in the dq coordinate system. In this manner, the dq coordinate converter 32 determines a rotating-coordinate-system current vector $i_{dq}$ that has vector components including a d-axis current $i_d$ being a current component in the d-axis direction and a q-axis current $i_q$ being a current component in the q-axis direction.

The bandpass filters 33 and 34 (examples of extractors) allows high-frequency components of currents flowing into the motor 2 to pass through with the high-frequency signal $v_{dh}^*$. More specifically, the bandpass filter 33 receives the d-axis current $i_d$, and extracts a component having the same frequency as that of the high-frequency signal $v_{dh}^*$ from the d-axis current $i_d$ to output this component as a d-axis high-frequency current $i_{dh}$. The bandpass filter 34 receives the q-axis current $i_q$, and extracts a component having the same frequency as that of the high-frequency signal $v_{dh}^*$ from the q-axis current $i_q$ to output this component as a q-axis high-frequency current $i_{qh}$.

The subtracter 35 subtracts the d-axis high-frequency current $i_{dh}$ from the d-axis current $i_d$ to generate and output the d-axis current $i_{dfb}$. In this manner, the d-axis current $i_{dfb}$ is generated by removing high-frequency signal components from the d-axis current $i_d$. The subtracter 36 subtracts the q-axis high-frequency current $i_{qh}$ from the q-axis current $i_q$ to generate and output the q-axis current $i_{qfb}$. In this manner, the q-axis current $i_{qfb}$ is generated by removing high-frequency signal components from the q-axis current $i_q$.

Furthermore, the control unit 12 of the motor control apparatus 3 includes a speed estimator 40 and a position estimator 41, and estimates the magnetic-pole position of the rotor of the motor 2.

The speed estimator 40 estimates an angular speed of the rotor on the basis of the d-axis high-frequency current $i_{dh}$, the q-axis high-frequency current $i_{qh}$, and the high-frequency signal $v_{dh}^*$, and outputs a speed estimated value ω^, which is the estimated result, to the non-interference controller 22 and the position estimator 41. The speed estimator 40 estimates the speed of the motor 2 in accordance with a technique, for example, described in Japanese Patent Application Laid-open No. 2000-102300 or Japanese Patent Application Laid-open No. 2007-49782.

For example, the speed estimator 40 converts the d-axis high-frequency current $i_{dh}$ and the q-axis high-frequency current $i_{qh}$ into a dm-axis high-frequency current $i_{dmh}$ and a qm-axis high-frequency current $i_{qmh}$ in a dmqm coordinate system that is shifted 45 degrees from the dq coordinate system by rotating-coordinate conversion. Furthermore, the speed estimator 40 estimates high-frequency impedances $Z_{dm}$ and $Z_{qm}$ at points 45 degrees ahead and behind in electrical angle from the d-axis or the q-axis on the basis of the dm-axis high-frequency current $i_{dmh}$ the qm-axis high-frequency current $i_{qmh}$, and the high-frequency signal $v_{dh}^*$. Subsequently, the speed estimator 40 determines a speed estimated value ω^ such that the deviation between the high-frequency impedances $Z_{dm}$ and $Z_{qm}$ becomes zero with the PI control or other methods.

The position estimator 41 receives the speed estimated value ω^, the q-axis integrated value vc, the d-axis current $i_{dfb}$, and the q-axis current $i_{qfb}$, and estimates the initial magnetic-pole position of the rotor to output the position estimated value (phase estimated value) θ^. The position estimator 41 integrates the speed estimated value ω^ output from the speed estimator 40 to calculate the position estimated value θ^, then identifies the polarity at the magnetic-pole position of the rotor, and corrects the position estimated value θ^ on the basis of the determination result.

Two cycles of variation period of an inductance component of the motor 2 correspond to one cycle of electrical angle of the motor 2, and thus two cycles of variation of the d-axis current due to the inductance component correspond to one cycle of electrical angle of the motor 2. Thus, when the speed estimated value ω^ output from the speed estimator 40 is integrated to determine the position estimated value θ^, the position estimated value θ^ may be an estimated value shifted 180 degrees.

To compensate such a shift in the estimated value, the position estimator 41 corrects the position estimated value θ^ by determining the polarity (the north pole, the south pole). In the position estimator 41, the polarity determination when the rotor is rotating is performed based on the q-axis integrated value vc of the q-axis current controller 21.

The q-axis integrated value vc of the q-axis current controller 21 is multiplied by a voltage for a counter-electromotive force generated in a stator winding of the motor 2, i.e., a value corresponding to the induced voltage. The variation period of the induced voltage is the same as the period of electrical angle of the motor 2, and thus the position estimator 41 performs the polarity determination based on the q-axis integrated value vc.

The control unit 12 has a speed estimation observer not depicted. The control unit 12 can perform the polarity determination with this speed estimation observer when the speed of the rotor exceeds a certain speed (e.g., 10% of the rated speed). The speed estimation observer receives the voltage references $v_d^*$ and $v_q^*$ and the detected currents $i_{dfb}$ and $i_{qfb}$, for example, and estimates an induced voltage generated in the stator winding of the motor 2 using a model of the motor 2 to determine the speed estimated value $\hat{\omega}$.

Figure 4:
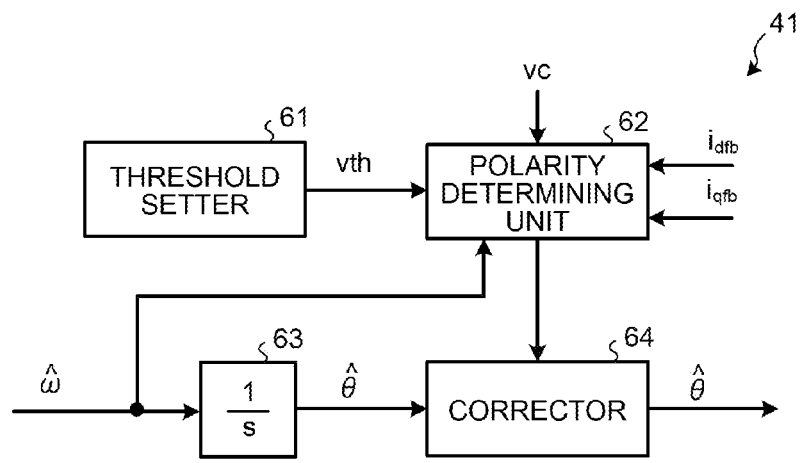
FIG. 4 is a diagram illustrating a configuration example of a position estimator depicted in FIG. 2.

FIG. 4 is a diagram illustrating a configuration example of the position estimator 41. As depicted in FIG. 4, the position estimator 41 includes a threshold setter 61, a polarity determining unit 62, an integrator 63, and a corrector 64, and performs the polarity determination with either of a first determination method or a second determination method. The first determination method is an determination method using the magnetic saturation characteristic of the d-axis inductance $L_d$, and the second determination method is an determination method using the q-axis integrated value vc of the q-axis current controller 21.

The threshold setter 61 outputs a certain voltage threshold vth. The voltage threshold vth is a threshold for determining whether to use the first determination method or the second determination method for the magnetic-pole polarity.

When the absolute value of the q-axis integrated value vc is equal to or smaller than the voltage threshold vth, the polarity determining unit 62 considers that the motor 2 is stopped and performs the polarity determination by the first determination method. When the absolute value of the q-axis integrated value vc exceeds the voltage threshold vth, the polarity determining unit 62 considers that the motor 2 is rotating and performs the polarity determination by the second determination method.

A voltage judgment value vJ is now defined by the following formula (3):

$$vJ = vc \cdot \text{sign}(\hat{\omega}) \quad (3)$$

where $\text{sign}(\hat{\omega})$ is a sign of the speed estimated value $\hat{\omega}$, the sign is plus (+) when the rotation direction of the motor 2 is in forward rotation, whereas the sign is minus (−) when the rotation direction of the motor 2 is in reverse rotation.

The polarity determining unit 62 performs determination of the magnetic-pole polarity by the first determination method when $vJ \leq vth$ or $vJ \geq -vth$, and performs the polarity determination by the second determination method when $vJ > vth$ or $vJ < -vth$.

In the first determination method, the d-axis current reference $i_d^*$ is generated so that a pulse voltage having positive and negative polarities is output, and also control in the d-axis current controller 20 and the q-axis current controller 21 is changed from the PI control to a proportional (P) control. Subsequently, based on the deviation between the rate of change in the d-axis current $i_{dfb}$ when the pulse voltage is output in the positive polarity and the rate of change in the d-axis current $i_{dfb}$ when the pulse voltage is output in the negative polarity, the polarity determining unit 62 performs determination of the magnetic-pole polarity to determine whether the polarity at the magnetic-pole position (the plus d-axis direction) of the rotor is the south pole or the north pole. This first determination method is a known technique, which is a technique described in Japanese Patent Application Laid-open No. 2011-193726, for example.

In the second determination method, the polarity determining unit 62 performs the polarity determination based on the polarity of the q-axis integrated value vc. In an initial magnetic-pole position estimating process, the control unit 12 sets the d-axis current reference $i_d^*$ and the q-axis current reference $i_q^*$ to zero to perform control so that the d-axis current $i_d$ and the q-axis current $i_q$ become zero.

During this control, if the rotor of the motor 2 is rotating due to free running or drag by a load, induced voltage is generated in the stator winding of the motor 2 by the counter-electromotive force, and accordingly, the q-axis integral term of the q-axis current controller 21 is multiplied by a voltage $\omega\phi$ corresponding to the induced voltage. In addition, the polarity of the induced voltage is reversed depending on the rotation direction of the rotor, and thus the polarity of the q-axis integrated value vc is reversed depending on the rotation direction of the rotor in the same manner.

In view of this, when the rotation direction of the rotor is in forward rotation, the polarity determining unit 62 identifies the polarity at the magnetic-pole position of the rotor as the north pole if the q-axis integrated value vc is positive, and identifies the polarity at the magnetic-pole position of the rotor as the south pole if the q-axis integrated value vc is negative. When the rotation direction of the rotor is in reverse rotation, the polarity determining unit 62 identifies the polarity at the magnetic-pole position of the rotor as the south pole if the q-axis integrated value vc is positive, and identifies the polarity at the magnetic-pole position of the rotor as the north pole if the q-axis integrated value vc is negative.

The polarity determining unit 62 outputs north-pole determination information (e.g., an L-level signal) to the corrector 64 when the polarity at the magnetic-pole position of the rotor is identified as the north pole, and outputs south-pole determination information (e.g., a H-level signal) to the corrector 64 when the polarity at the magnetic-pole position of the rotor is identified as the south pole.

The integrator 63 integrates the speed estimated value $\hat{\omega}$ output from the speed estimator 40 to determine the position estimated value $\hat{\theta}$. The position estimated value $\hat{\theta}$ determined by integrating the speed estimated value $\hat{\omega}$ may be shifted 180 degrees as described above. For this reason, the corrector 64 determines whether to perform correction on the position estimated value $\hat{\theta}$ on the basis of the polarity identified by the polarity determining unit 62.

More specifically, the corrector 64 does not perform correction on the position estimated value $\hat{\theta}$ when the north-pole determination information is output from the polarity determining unit 62, and performs correction adding π to the position estimated value $\hat{\theta}$ when the south-pole determination information is output from the polarity determining unit 62.

Figure 5:
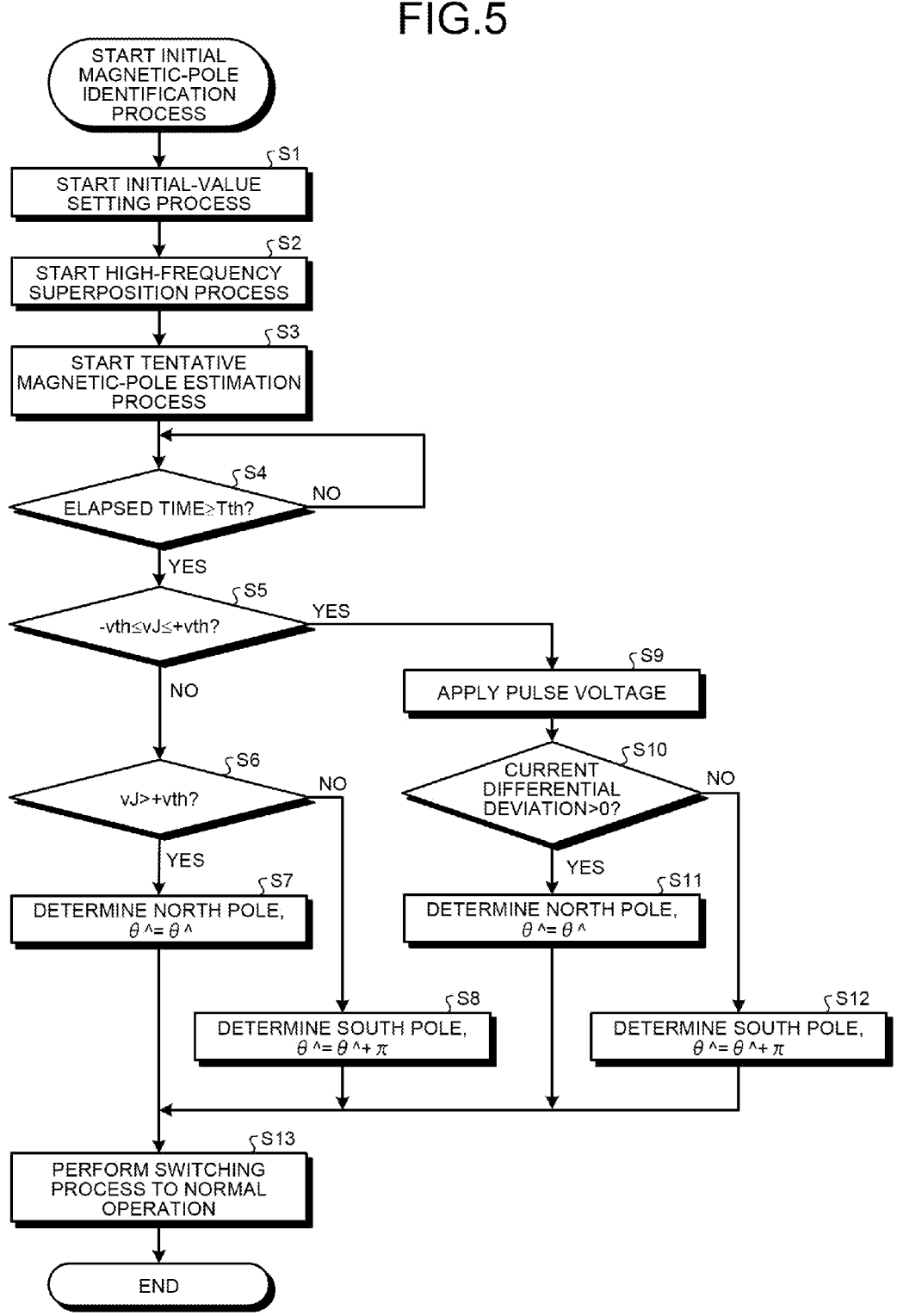
FIG. 5 is a flowchart of an initial magnetic-pole determination process performed by the control unit depicted in FIG. 2.

The flow of an initial magnetic-pole polarity determination process performed by the control unit 12 thus configured will be described in detail with reference to FIG. 5. FIG. 5 is a flowchart illustrating the flow of the initial magnetic-pole determination process performed by the control unit 12. The initial magnetic-pole determination process is a process performed before the motor 2 is driven, in which the position estimated value $\hat{\theta}$ is determined as an initial magnetic-pole position by the initial magnetic-pole determination process, and a drive current is supplied to the motor 2 on the basis of the position estimated value $\hat{\theta}$, whereby the motor 2 is driven.

As depicted in FIG. 5, in the initial magnetic-pole determination process, the control unit 12 performs an initial-value setting process first (step S1). The initial-value setting process includes a process for determining an amplitude value va of the high-frequency signal $v_{dh}^*$, a process for starting the PI control of the d-axis current controller 20 and the q-axis current controller 21, a process for stopping operation of the non-interference controller 22, and a process for setting a judgment value Tth described later.

Next, the control unit 12 starts a high-frequency superposition process (step S2). The control unit 12 performs this high-frequency superposition process by causing the high-frequency signal generator 25 to output the high-frequency signal $v_{dh}*$ and causing the adder 26 to add the high-frequency signal $v_{dh}*$ to the d-axis voltage reference $v_d*$.

Next, the control unit 12 starts a tentative magnetic-pole estimation process (step S3). The control unit 12 performs this tentative magnetic-pole estimation process by causing the speed estimator 40 to output the speed estimated value $\hat{\omega}$ and causing the position estimator 41 to integrate the speed estimated value $\hat{\omega}$ and output the position estimated value $\hat{\theta}$ therefrom. In the tentative magnetic-pole estimation process, correction of the position estimated value $\hat{\theta}$ is not performed by the corrector 64, and the position estimated value $\hat{\theta}$ output from the integrator 63 is output from the corrector 64 without being processed.

Subsequently, the control unit 12 determines whether a time elapsed from the start of the tentative magnetic-pole estimation process is equal to or longer than the judgment value Tth (step S4). The control unit 12 repeats this judgment process when the elapsed time is shorter than the judgment value Tth (No at step S4). The judgment value Tth is about 300 milliseconds, for example, which is a time until the estimation of the speed estimated value $\hat{\omega}$ performed by the speed estimator 40 stabilizes.

The control unit 12 ends the tentative magnetic-pole estimation process and performs a polarity determination process and a correction process when determining that the elapsed time is equal to or longer than the judgment value Tth (Yes at step S4). More specifically, the polarity determining unit 62 determines whether the absolute value of the voltage judgment value vJ is equal to or smaller than the voltage threshold vth (step S5).

Upon determining that the voltage judgment value vJ is not equal to or smaller than the voltage threshold vth (No at step S5), the polarity determining unit 62 performs the polarity determination by the second determination method. More specifically, the polarity determining unit 62 determines whether the voltage judgment value vJ exceeds the voltage threshold vth (step S6). When the voltage judgment value vJ exceeds the voltage threshold vth (Yes at step S6), the polarity determining unit 62 determines that the polarity at the magnetic-pole position of the rotor is the north pole, and outputs the position estimated value $\hat{\theta}$ calculated by the integrator 63 from the corrector 64 without correcting the value (step S7).

When the voltage judgment value vJ does not exceed the voltage threshold vth (No at step S6), the polarity determining unit 62 determines that the polarity at the magnetic-pole position of the rotor is the south pole. In this case, the corrector 64 performs correction to adds $\pi$ to the position estimated value $\hat{\theta}$ calculated by the integrator 63, and outputs the corrected position estimated value $\hat{\theta}$ (step S8).

At step S5, upon determining that the voltage judgment value vJ is equal to or smaller than the voltage threshold vth (Yes at step S5), the polarity determining unit 62 performs the polarity determination by the first determination method. More specifically, the control unit 12 performs a pulse-voltage applying process for applying a pulse voltage having positive and negative polarities to the motor 2 (step S9).

This pulse-voltage applying process is performed by stopping operation of the high-frequency signal generator 25, changing the PI control of the d-axis current controller 20 and the q-axis current controller 21 to the proportional control (P control), and inputting the d-axis current reference $i_d*$ for generating the pulse voltage having positive and negative polarities to the d-axis current controller 20.

The polarity determining unit 62 determines whether the deviation of the rate of change of the d-axis current $i_{dfb}$ due to the pulse voltage having positive and negative polarities (hereinafter referred to as the current differential deviation) is a positive value (step S10). When the current differential deviation is a positive value (Yes at step S10), the polarity determining unit 62 determines that the polarity at the magnetic-pole position is the north pole. In this case, the corrector 64 outputs the position estimated value $\hat{\theta}$ calculated by the integrator 63 without correcting the value (step S11).

When the current differential deviation is not a positive value (No at step S10), the polarity determining unit 62 determines that the polarity at the magnetic-pole position of the rotor is the south pole. In this case, the corrector 64 performs correction to add $\pi$ to the position estimated value $\hat{\theta}$ calculated by the integrator 63, and outputs the corrected position estimated value $\hat{\theta}$ (step S12).

When steps S7, S8, S11, and S12 are completed, the control unit 12 performs a switching process from the initial magnetic-pole determination process to the normal operation (step S13). The control unit 12 performs in this switching process, for example, a process for causing the PI control of the d-axis current controller 20 and the q-axis current controller 21 to operate, a process for causing the non-interference controller 22 to operate, a generating process of a current reference for driving the motor 2, and the high-frequency superposition process described above. After the switching to the normal operation, the control unit 12 performs the high-frequency superposition process to continue to capture the magnetic-pole position. When the motor speed increases, it becomes possible to switch from the speed estimator 40 to a known induced-voltage observer (not depicted) provided to the control unit 12, whereby the high-frequency superposition process becomes unnecessary. The voltage $\omega\phi$ corresponding to the induced voltage is compensated by the non-interference controller 22, and thus the control unit 12 sets the q-axis integrated value of the q-axis current controller 21 to zero to reset the q-axis current controller 21 in the switching process to the normal operation.

In this manner, the control unit 12 performs the polarity determination of the magnetic-pole position with the q-axis integrated value vc of the q-axis current controller 21 under a state in which the d-axis current controller 20 and the q-axis current controller 21 are in operation. Thus the motor control apparatus 3 according to the present embodiment does not require complicated circuit configuration with an additional bandpass filter, for example, for separating each of a driving frequency component, a high-frequency impedance component, and a direct current component from a detected current in comparison with the case of polarity determination performed with a pulse voltage applied. This makes it possible to easily perform polarity determination of the magnetic-pole position. Furthermore, the pulse voltage is a signal containing all frequency components, and it is difficult to fabricate a filter that can completely remove these components. In view of this, the polarity determination of the magnetic-pole position according to the present embodiment using no pulse voltage has the potential to improve accuracy.

A process for setting the amplitude value va of the high-frequency signal $v_{dh}*$ performed at step S1 described above will be described. When the rotor of the motor 2 is rotating, the counter-electromotive force is generated in the stator winding of the motor 2, and a current of the counter-electromotive force component flows into the stator winding as described above. Thus an error of the position estimated value $\hat{\theta}$ in the initial magnetic-pole position estimation process becomes larger as the electrical angular speed increases, and hence the error of the position estimated value $\hat{\theta}$ may exceed the allowable range.

In view of this, the motor control apparatus 3 according to the present embodiment is configured to set the amplitude value va of the high-frequency signal $v_{dh}^*$ so that the error of the position estimated value $\hat{\theta}$ is in the allowable range. This configuration will be described in detail below.

The induced voltage generated in the motor 2 will be described. A voltage-current equation for the motor 2 in the dq coordinates is expressed as the following formula (4). In the following formula (4), $v_d$ and $v_q$ are the d-axis component and the q-axis component of a voltage applied to the motor 2, R is a winding resistance value of the motor 2, and p is a differential operator.

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \begin{bmatrix} 0 \\ \omega\phi \end{bmatrix} \quad (4)$$

When the initial magnetic-pole position estimation is performed, the motor 2 is usually stopped or rotates at a very low speed. In this case, the voltage-current equation given by the above formula (4) can be replaced with the following formula (5).

$$\begin{bmatrix} v_d \\ v_q \end{bmatrix} = \begin{bmatrix} R + pL_d & 0 \\ 0 & R + pL_q \end{bmatrix} \begin{bmatrix} i_d \\ i_q \end{bmatrix} \quad (5)$$

The d-axis current reference $i_d^*$ and the q-axis current reference $i_q^*$ are set to zero in the initial magnetic-pole position estimation process, thus the voltages given by the above formula (5) are high-frequency voltages $v_{dh}$ and $v_{qh}$ due to the high-frequency signal $v_{dh}^*$, and hence the above formula (5) can be replaced with the following formula (6).

$$\begin{bmatrix} v_{dh} \\ v_{qh} \end{bmatrix} = \begin{bmatrix} R + pL_d & 0 \\ 0 & R + pL_q \end{bmatrix} \begin{bmatrix} i_{dh} \\ i_{qh} \end{bmatrix} \quad (6)$$

Furthermore, in the above formula (6), by performing replacement with $p=j\omega_h$, the above formula (6) can be expressed as the following formula (7):

$$\begin{bmatrix} v_{dh} \\ v_{qh} \end{bmatrix} = \begin{bmatrix} R + j\omega_h L_d & 0 \\ 0 & R + j\omega_h L_q \end{bmatrix} \begin{bmatrix} i_{dh} \\ i_{qh} \end{bmatrix} \quad (7)$$

where $\omega_h$ is the frequency of the high-frequency signal $v_{dh}^*$.

The high-frequency signal $v_{dh}^*$ is selectively superposed with respect to the d-axis, and thus it is possible to set $v_{qh}=0$. In addition, because the component of the d-axis inductance $L_d$ is dominant over the resistance R, the above formula (7) can be expressed as the following formula (8).

$$\begin{bmatrix} v_{dh} \\ 0 \end{bmatrix} = \begin{bmatrix} j\omega_h L_d i_{dh} \\ 0 \end{bmatrix} \quad (8)$$

When the rotor of the motor 2 is rotating, a counter-electromotive force is generated in the stator winding of the motor 2, and thus an induced voltage appears in the q-axis. This induced voltage can be expressed as the following formula (9) with the electric angular speed $\omega$ and the induced voltage constant $\phi$ of the motor 2.

$$\begin{bmatrix} v_d \\ v_q \end{bmatrix} = \begin{bmatrix} 0 \\ \omega\phi \end{bmatrix} \quad (9)$$

From the above formulas (7) to (9), the following formula (10) can be derived. As can be seen in this formula (10), the d-axis high-frequency current $i_{dh}$ flows by superposition of the high-frequency signal $v_{dh}^*$ on the d-axis voltage, and further the q-axis high-frequency current $i_{qh}$ flows by the counter-electromotive force generated by the rotation of the rotor.

$$\begin{bmatrix} v_{dh} \\ \omega\phi \end{bmatrix} = \begin{bmatrix} j\omega_h L_d i_{dh} \\ j\omega_h L_q i_{qh} \end{bmatrix} \quad (10)$$

Although the q-axis high-frequency current $i_{qh}$ caused by the rotation of the rotor can be controlled with the q-axis voltage compensating value $v_{qff}$ generated by the non-interference controller 22, the polarity at the magnetic-pole position of the rotor is not known before the initial magnetic-pole position estimation. Thus the positive/negative polarity of the q-axis voltage compensating value $v_{qff}$ may be reversed in the non-interference controller 22. Thus, until the initial magnetic-pole position estimation is completed, the operation of the non-interference controller 22 is stopped as described above, and the q-axis high-frequency current $i_{qh}$ flows if the rotor of the motor 2 is rotating.

When the rotor of the motor 2 is rotating, the q-axis high-frequency current $i_{qh}$ and the d-axis high-frequency current $i_{dh}$ that flow into the motor 2 by the superposition of the high-frequency signal $v_{dh}^*$ on the d-axis voltage can be expressed as the following formulas (11) and (12), respectively.

$$i_{dh} = j\frac{v_{dh}}{\omega_h L_d} \quad (11)$$

$$i_{qh} = j\frac{\omega\phi}{\omega_h L_q} \quad (12)$$

As can be seen in the above formulas (11) and (12), the q-axis high-frequency current $i_{qh}$ can be reduced with an increase in the frequency $\omega_h$ of the high-frequency signal $v_{dh}^*$, but the d-axis high-frequency current $i_{dh}$ will also be reduced at a reduction rate the same as the reduction rate of the q-axis high-frequency current $i_{qh}$. Thus, if the frequency $\omega_h$ of the high-frequency signal $v_{dh}^*$ increases, the error of the position estimated value $\hat{\theta}$ does not change.

In contrast, the effect of the q-axis high-frequency current $i_{qh}$ decreases as the ratio of the d-axis high-frequency current $i_{dh}$ to the q-axis high-frequency current $i_{qh}$ increases, and thus the error of the position estimated value $\hat{\theta}$ becomes smaller. In the motor control apparatus 3 of the present embodiment, the ratio of the inductance component to the counter-electromotive force component, i.e., the ratio of the d-axis high-frequency current $i_{dh}$ to the q-axis high-frequency current $i_{qh}$ is defined as an evaluation index EI. This evaluation index EI can be expressed as the following formula (13), in which the error of the position estimated value $\hat{\theta}$ becomes smaller as the evaluation index EI becomes larger, and thus the magnetic-pole position estimation with reduced effects of the counter-electromotive force is possible.

$$EI = \frac{i_{dh}}{i_{qh}} = \frac{jv_{dh}}{\omega_h L_d} \cdot \frac{\omega_h L_q}{j\omega\phi} = \frac{v_{dh}}{\omega\phi} \frac{L_q}{L_d} \quad (13)$$

According to the above formula (13), the evaluation index EI becomes larger and the error of the position estimated value θ^ becomes smaller with an increase in the amplitude value va of the high-frequency signal $v_{dh}^*$. However, when the amplitude value va of the high-frequency signal $v_{dh}^*$ increases, the level of high-frequency torque ripple becomes higher, and thus it is desirable that the frequency $\omega_h$ increase in response to the increase of the amplitude value va of the high-frequency signal $v_{dh}^*$ to suppress the increase of the high-frequency torque ripple.

As can be seen from the above formula (13), the error of the position estimated value θ^ becomes larger as the electrical angular speed ω of the motor 2 increases. If the electrical angular speed ω of the motor 2 is at a certain level, the above-described speed estimation observer, for example, can be used. However, if the electrical angular speed ω of the motor 2 is slow, the induced voltage generated in the stator winding of the motor 2 is small, and thus the speed estimation with the speed estimation observer is difficult.

In view of this, in the motor control apparatus 3 according to the present embodiment, when the electrical angular speed ω of the motor 2 is equal to or smaller than the set speed $\omega_{ref}$ (hereinafter referred to as the judgment reference speed $\omega_{ref}$), the amplitude value va of the high-frequency signal $v_{dh}^*$ is set so that the error of the position estimated value θ^ is within the allowable range. The amplitude value va of the high-frequency signal $v_{dh}^*$ can be expressed as the following formula (14) from the above formula (13).

$$va = EI \cdot \omega_{ref} \cdot \phi \frac{L_d}{L_q} \quad (14)$$

Furthermore, because the error of the position estimated value θ^ depends on the evaluation index EI, the amplitude value va of the high-frequency signal $v_{dh}^*$ can be derived by, for example, defining the error of the position estimated value θ^ as the upper limit for acceptable values and inputting the evaluation index EI corresponding to the error of this upper limit for acceptable values into the above formula (14).

Figure 6:
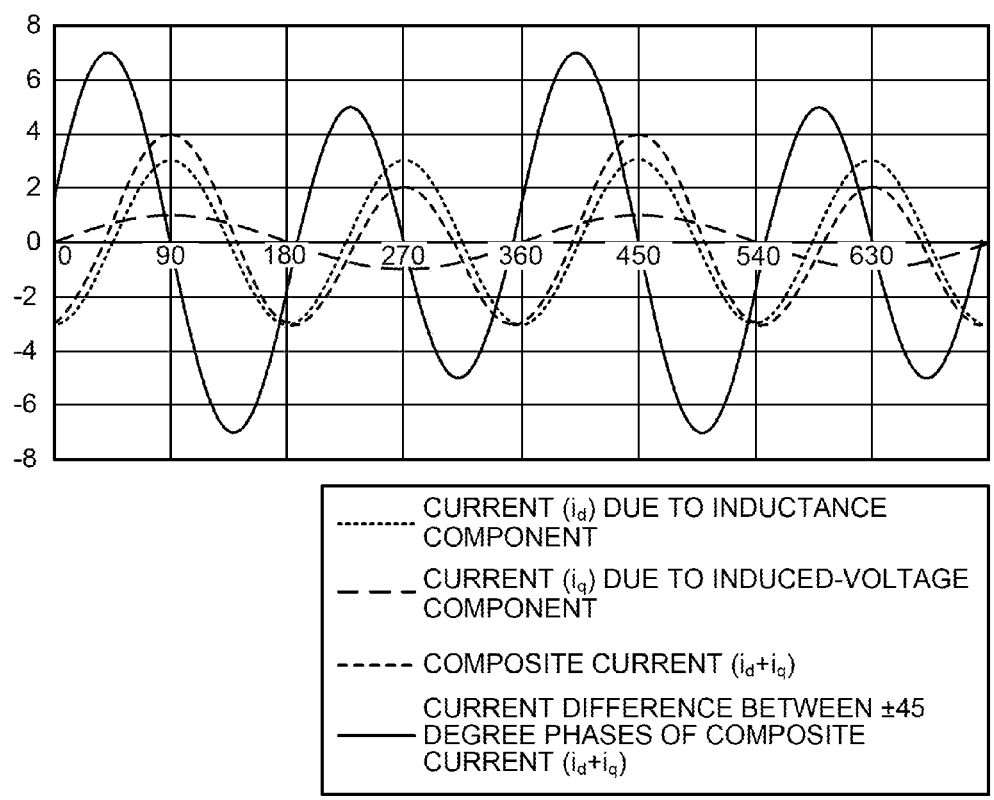
FIG. 6 is a diagram illustrating current waveforms of respective components when an evaluation index is three.
Figure 7:
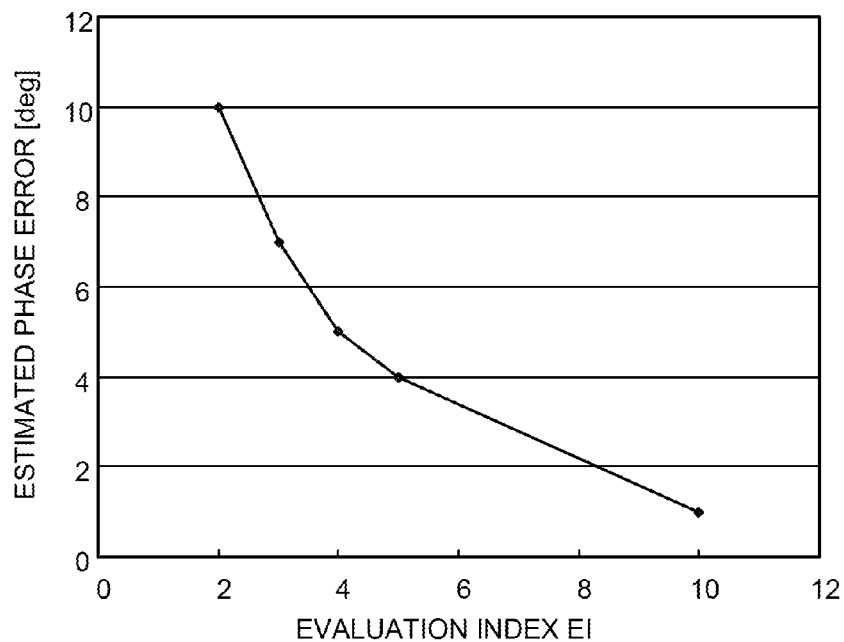
FIG. 7 is a diagram illustrating a relation between evaluation indices and errors of position estimated values.

The relation between the error of the position estimated value θ^ and the evaluation index EI will be described. FIG. 6 is a diagram illustrating current waveforms of respective components when the evaluation index EI is three, and FIG. 7 is a diagram illustrating a relation between evaluation indices EI and errors of position estimated values. In FIG. 6, the horizontal axis represents the electrical angle (magnetic-pole position) of the rotor.

As depicted in FIG. 6, phases (magnetic-pole positions) at which a current difference between ±45 degree phases of the composite current of a current due to the inductance component and a current due to the induced-voltage component becomes zero are shifted in the leading direction near the north pole and in the lagging direction near the south pole. This phase shifting becomes larger as the evaluation index EI that is a ratio of the d-axis high-frequency current $i_{dh}$ to the q-axis high-frequency current $i_{qh}$ becomes smaller as depicted in FIG. 7.

When the evaluation index EI is made larger, the high-frequency torque ripple becomes larger as described above, and thus it is desirable to control the evaluation index EI within the error of the upper limit for acceptable values. For example, when the upper limit of the allowable error range of the position estimated value θ^ is 10 degrees, the evaluation index EI is set to two, whereby the high-frequency torque ripple can be suppressed.

Figure 8:
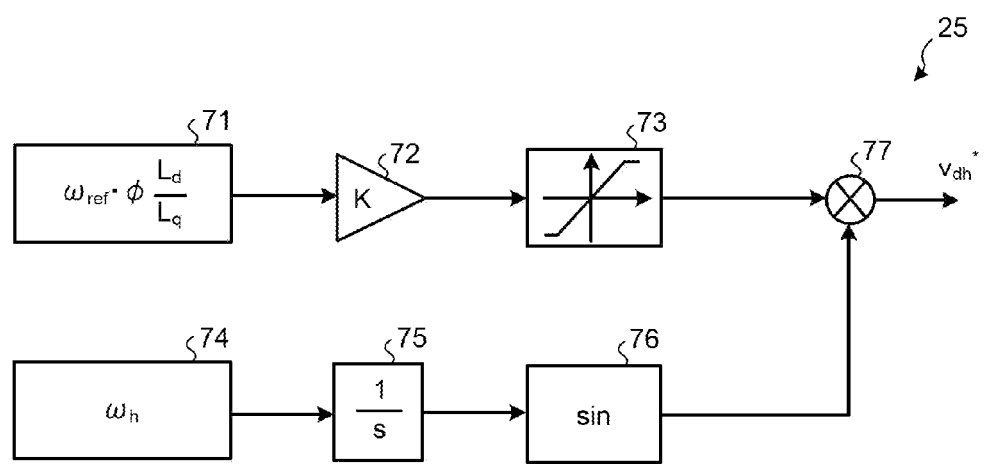
FIG. 8 is a diagram illustrating a configuration example of a high-frequency signal generator depicted in FIG. 2.

FIG. 8 is a diagram illustrating a configuration example of the high-frequency signal generator 25. As depicted in FIG. 8, the high-frequency signal generator 25 includes a d-axis high-frequency voltage calculator 71, an amplifier 72, a limiter 73, a high-frequency frequency generator 74, an integrator 75, a sinusoidal calculator 76, and multiplier 77.

The d-axis high-frequency voltage calculator 71 calculates an amplitude reference value (=va/EI) on the basis of the induced voltage constant φ, the d-axis inductance $L_d$, the q-axis inductance $L_q$, and the judgment reference speed $\omega_{ref}$ of the motor 2 in accordance with the above formula (14), for example. The judgment reference speed $\omega_{ref}$ is a frequency that is one tenth of the rated frequency of the motor 2.

The amplifier 72, having a gain K corresponding to the evaluation index EI, multiplies the amplitude reference value of the d-axis high-frequency voltage calculator 71 by K to determine the amplitude value va, and outputs this result to the limiter 73. The gain K is determined in consideration of the high-frequency torque ripple that is allowable in the motor drive system 1, and K=3 to 5, for example. The limiter 73 limits the upper limit and the lower limit for the output of the amplifier 72. This makes it possible to suppress the high-frequency torque ripple even when an error, for example, occurs in setting of parameters such as the judgment reference speed $\omega_{ref}$ or the evaluation index EI.

The high-frequency frequency generator 74 generates a frequency $\omega_h$ and outputs it to a multiplier 77. This frequency $\omega_h$ is a frequency higher than the rated frequency of the motor 2, and is 200 to 1000 Hz.

The integrator 75 integrates the frequency r, to determine a phase angle $\theta_h$. The sinusoidal calculator 76 calculates the phase angle $\theta_h$ output from the integrator 75 with a sine function to determine a sinusoidal wave sin $\theta_h$, and outputs this result to the multiplier 77. The multiplier 77 multiplies the sinusoidal wave sin $\theta_h$ by the amplitude value va to generate a high-frequency signal $v_{dh}^*$, and outputs this signal to the adder 26 and the speed estimator 40.

In this manner, in the high-frequency signal generator 25, the amplitude value va of the high-frequency signal $v_{dh}^*$ is set based on the judgment reference speed $\omega_{ref}$, the evaluation index EI (corresponding to the gain K) corresponding to the allowable error of the position estimated value θ^ the induced voltage constant φ, the d-axis inductance $L_d$, and the q-axis inductance $L_q$.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control apparatus comprising:
   a power conversion unit that supplies power to a motor having salient pole characteristic; and
   a control unit that performs proportional-integral control to generate a voltage reference, and controls the power conversion unit on the basis of the voltage reference, the control unit being connected to the power conversion unit and including:

a current controller that performs the proportional-integral control on a deviation for a component of a q-axis orthogonal to a d-axis to generate a q-axis voltage reference; and a determining unit that determines a polarity of a magnetic-pole position of a rotor of the motor on the basis of a positive/negative polarity of a q-axis integrated value of the proportional-integral control, the determining unit being connected to the current controller, wherein the control unit estimates the magnetic-pole position of the rotor of the motor on the basis of a high-frequency current flowing into the motor by controlling the power conversion unit, the control unit corrects the estimated magnetic-pole position on the basis of the polarity of the q-axis integrated value of the proportional-integral control, and the control unit controls the power conversion on the basis of the q-axis voltage reference.

2. The motor control apparatus according to claim 1, wherein the control unit includes:

an adder that adds a high-frequency signal to a voltage reference of a d-axis parallel to a magnetic flux of the motor; and an extractor that extracts a high-frequency current corresponding to the high-frequency signal from the current flowing into the motor, wherein the current controller performs proportional-integral control on the deviation between the current reference and the current flowing into the motor for a component of the d-axis to generate a d-axis current reference, wherein the control unit also includes an estimator that estimates the magnetic-pole position of the rotor on the basis of the high-frequency current extracted by the extractor, and correcting the estimated magnetic-pole position on the basis of the positive/negative polarity of the q-axis integrated value of the current controller.

3. The motor control apparatus according to claim 2, wherein the estimator includes:

a speed estimator that determines a speed estimated value of the rotor on the basis of the high-frequency current extracted by the extractor;

an integrator that integrates the speed estimated value output from the speed estimator to determine a first position estimated value that is an estimated value of the magnetic-pole position; and a corrector that corrects the first position estimated value on the basis of the polarity determined by the determining unit to determine a second estimated value.

4. The motor control apparatus according to claim 2, wherein the estimator corrects the estimated magnetic-pole position on the basis of the positive/negative polarity of the q-axis integrated value of the current controller when the q-axis integrated value of the current controller exceeds a certain threshold.

5. The motor control apparatus according to claim 3, wherein the estimator corrects the estimated magnetic-pole position on the basis of the positive/negative polarity of the q-axis integrated value of the current controller when the q-axis integrated value of the current controller exceeds a certain threshold.

6. The motor control apparatus according to claim 2, further comprising a high-frequency signal generator that generates the high-frequency signal, wherein the high-frequency signal generator determines an amplitude value of the high-frequency signal on the basis of the set speed, an induced voltage constant, a d-axis inductance, and a q-axis inductance when an electrical angular speed of the rotor is equal to or lower then a set speed.

7. The motor control apparatus according to claim 3, further comprising a high-frequency signal generator that generates the high-frequency signal, wherein the high-frequency signal generator determines an amplitude value of the high-frequency signal on the basis of the set speed, an induced voltage constant, a d-axis inductance, and a q-axis inductance when an electrical angular speed of the rotor is equal to or lower than a set speed.

8. The motor control apparatus according to claim 4, further comprising a high-frequency signal generator that generates the high-frequency signal, wherein the high-frequency signal generator determines an amplitude value of the high-frequency signal on the basis of the set speed, an induced voltage constant, a d-axis inductance, and a q-axis inductance when an electrical angular speed of the rotor is equal to or lower than a set speed.

9. The motor control apparatus according to claim 5, further comprising a high-frequency signal generator that generates the high-frequency signal, wherein the high-frequency signal generator determines an amplitude value of the high-frequency signal on the basis of the set speed, an induced voltage constant, a d-axis inductance, and a q-axis inductance when an electrical angular speed of the rotor is equal to or lower than a set speed.

10. A motor control apparatus comprising:

means for performing proportional-integral control on a deviation between a current flowing into a motor having salient pole characteristic and a current reference to generate a voltage reference; the means for performing proportional-integral control including;

current control means for performing proportional-integral control on a deviation for a component of a q-axis orthogonal to a d-axis to generate a q-axis voltage reference; and means for determining a polarity of the magnetic-pole position of a rotor of the motor on the basis of a positive/negative polarity of a q-axis integrated value of the proportional-integral control, the means for determining being connected to the current control means;

means for estimating the magnetic-pole position of the rotor of the motor on the basis of a high-frequency current to the motor; and means for correcting the estimated magnetic-pole position on the basis of the polarity of the q-axis integrated value of the proportional-integral control, wherein the means for performing proportional-integral control controls power conversion on the basis of the q-axis voltage reference.

11. A magnetic-pole position estimating method comprising:

performing proportional-integral control, with a current controller, on a deviation between a q-axis current reference and a current flowing in the motor to generate a q-axis voltage reference;

determining, with a determining unit connected to the current controller, a polarity of a magnetic-pole position of a rotor of a motor on the basis of a positive/negative polarity of a q-axis intergrated value of the proportional-integral control;

estimating the magnetic-pole position of the rotor of the motor having salient pole characteristic on the basis of a high-frequency current applied from a power-conversion unit to the motor; and correcting the estimated magnetic-pole position on the basis of the polarity of the q-axis integrated value of the proportional integral control of the current controller.

* * * * *